No. 842,465.

PATENTED JAN. 29, 1907.

G. W. KING, H. J. BARNHART & C. B. KING.
STEAM ENGINE.
APPLICATION FILED AUG. 3, 1904.

6 SHEETS—SHEET 1.

Witnesses
G. Howard Walmsley
Irvine Miller

George W. King
Harry J. Barnhart
Charles B. King
By F. A. Fowler

No. 842,465. PATENTED JAN. 29, 1907.
G. W. KING, H. J. BARNHART & C. B. KING.
STEAM ENGINE.
APPLICATION FILED AUG. 3, 1904.
6 SHEETS—SHEET 1.
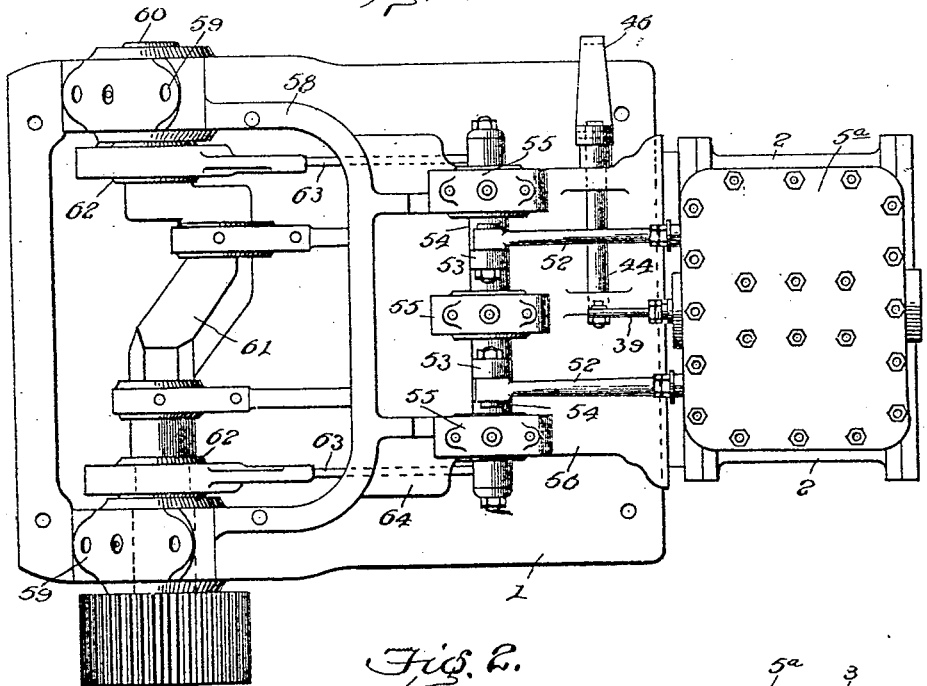
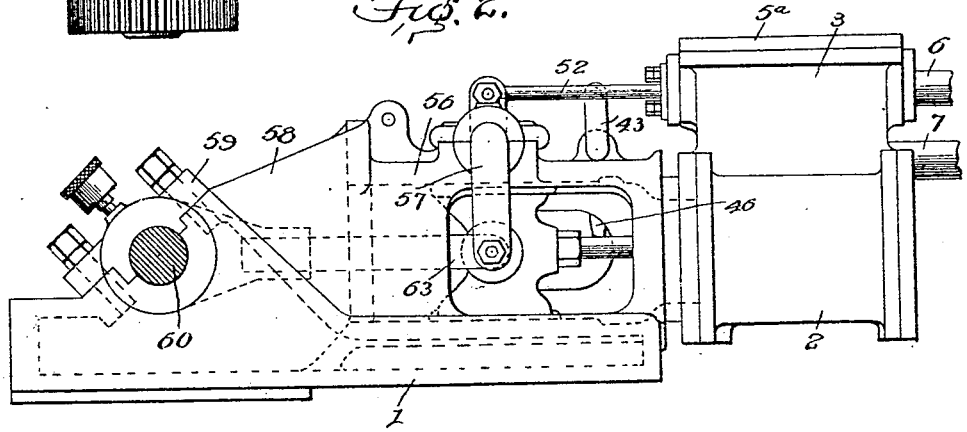
Witnesses
G. Howard Walmsley.
Irvine Miller.
Inventors
George W. King,
Harry J. Barnhart,
Charles B. King,
By
Attorney

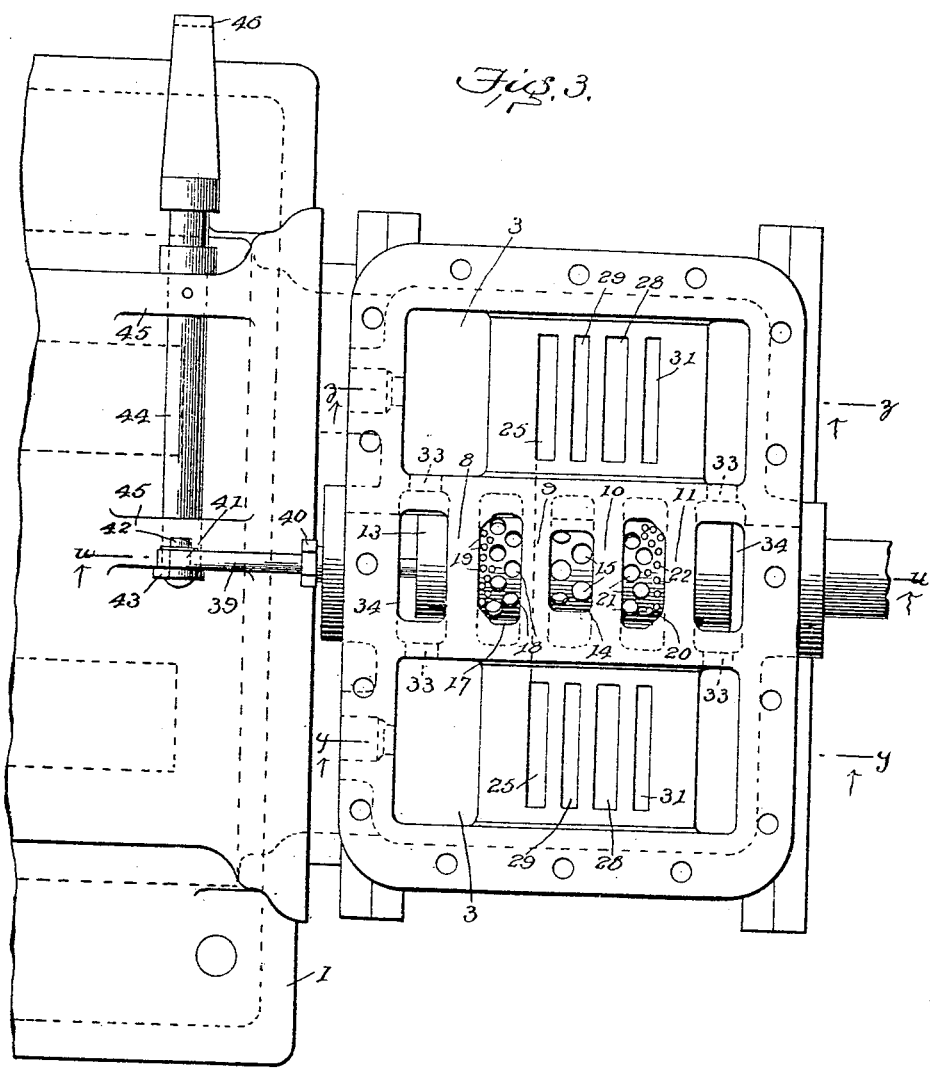

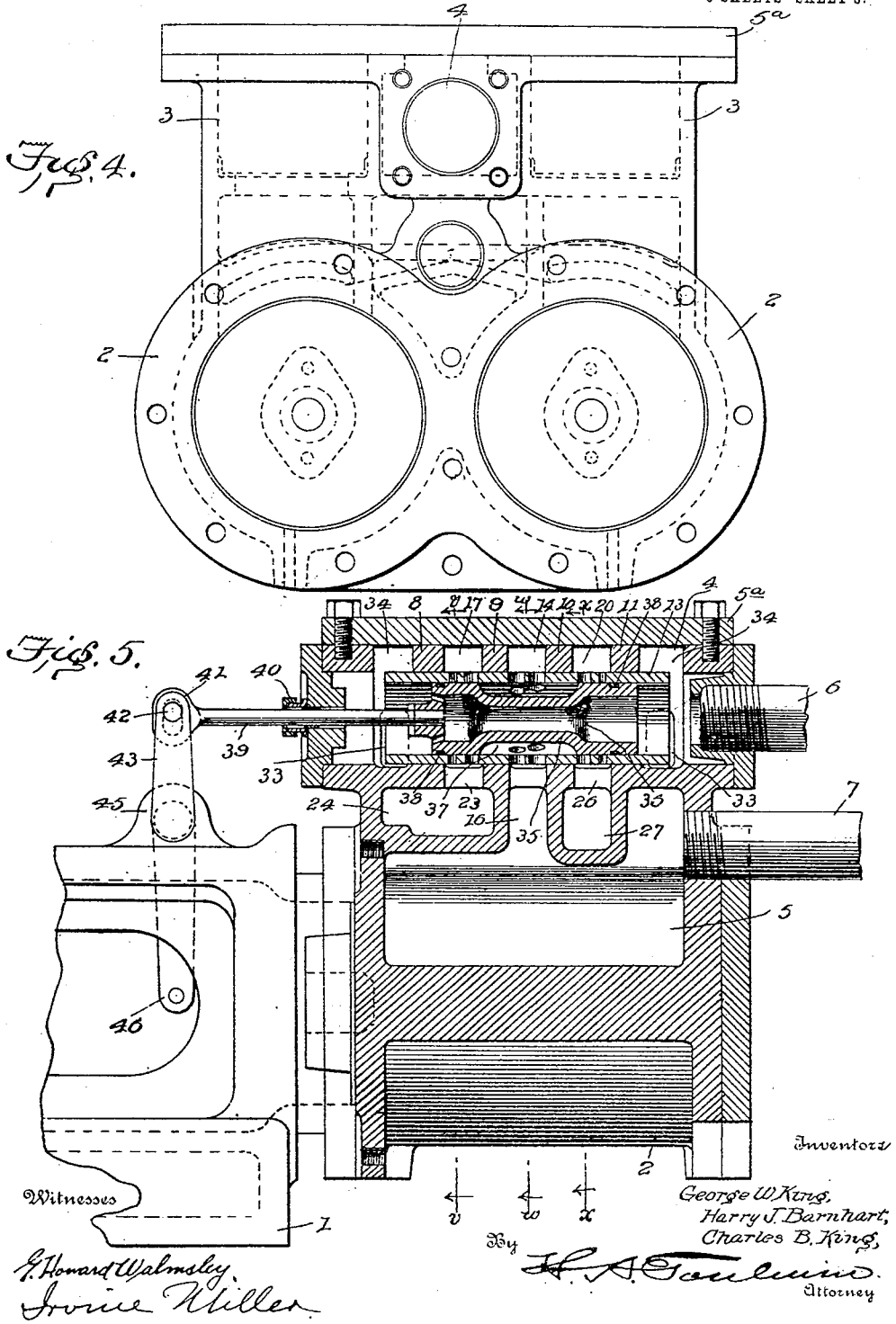

No. 842,465. PATENTED JAN. 29, 1907.
G. W. KING, H. J. BARNHART & C. B. KING.
STEAM ENGINE.
APPLICATION FILED AUG. 3, 1904.

6 SHEETS—SHEET 4.

Witnesses
E. Howard Walmsley,
Irvine Miller.

Inventors
George W. King,
Harry J. Barnhart,
Charles B. King,
By H. A. Goulding,
Attorney.

No. 842,465. PATENTED JAN. 29, 1907.
G. W. KING, H. J. BARNHART & C. B. KING.
STEAM ENGINE.
APPLICATION FILED AUG. 3, 1904.

6 SHEETS—SHEET 5.

Witnesses
F. Howard Walmsley.
Irvine Miller.

Inventors
George W. King,
Harry J. Barnhart,
Charles B. King,
By
H. A. Toulmin
Attorney No. 842,465.

PATENTED JAN. 29, 1907.

G. W. KING, H. J. BARNHART & C. B. KING.
STEAM ENGINE.
APPLICATION FILED AUG. 3, 1904.

6 SHEETS—SHEET 6.

Witnesses
G. Howard Walmsley.
Irvine Miller.

Inventors
George W. King,
Harry J. Barnhart,
Charles B. King,
By
H. A. Toulmin.
Attorney

UNITED STATES PATENT OFFICE.

GEORGE W. KING, HARRY J. BARNHART, AND CHARLES B. KING, OF MARION, OHIO, ASSIGNORS TO THE MARION STEAM SHOVEL COMPANY, OF MARION, OHIO, A CORPORATION OF OHIO.

STEAM-ENGINE.

No. 842,465.  Specification of Letters Patent.  Patented Jan. 29, 1907.

Application filed August 3, 1904. Serial No. 219,267.

*To all whom it may concern:*

Be it known that we, GEORGE W. KING, HARRY J. BARNHART, and CHARLES B. KING, citizens of the United States, residing at Marion, in the county of Marion and State of Ohio, have invented certain new and useful Improvements in Reversible Steam-Engines, of which the following is a specification, reference being had therein to the accompanying drawings.

This invention relates to reversible steam-engines, being devised more particularly for use in connection with the crowding and swinging engines of steam-shovels or the like, although obviously capable of other application.

The invention relates to the type of engine employing a reversing-valve to control the distribution of steam to the slide-valves, which in turn control its distribution to the engine-cylinders; and the invention has for its object to improve the durability, efficiency, and compactness of engines of this type.

To these and other ends our present invention consists in certain novel features, which we shall now proceed to describe and will then particularly point out in the claims.

Figure 1:
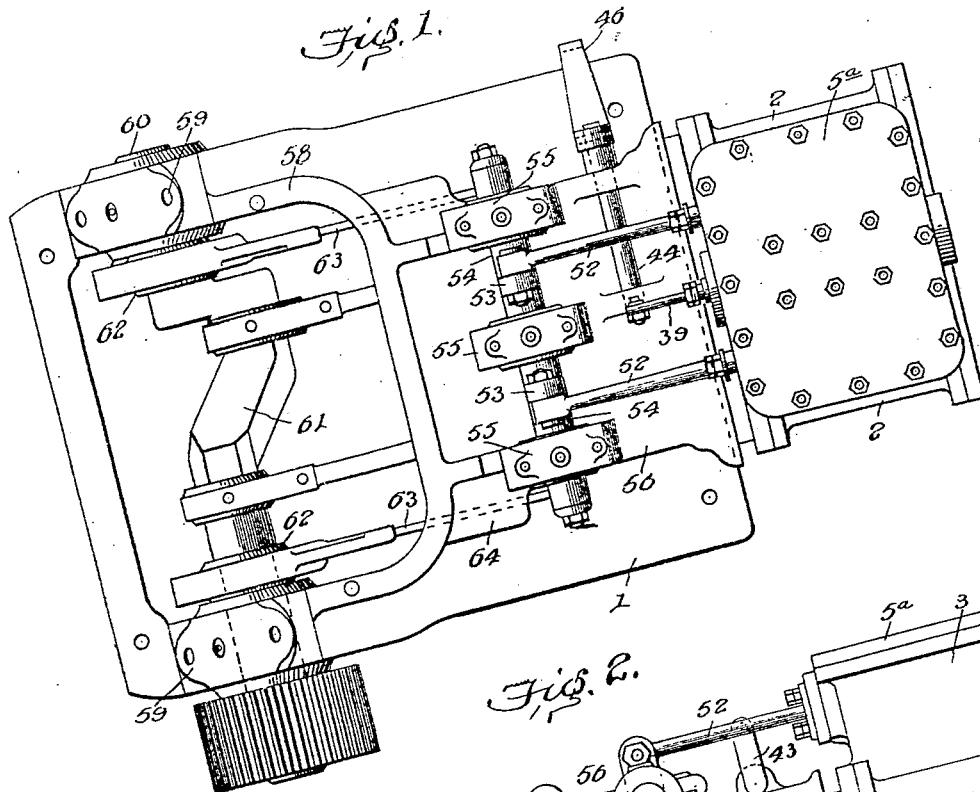
Figure 2:
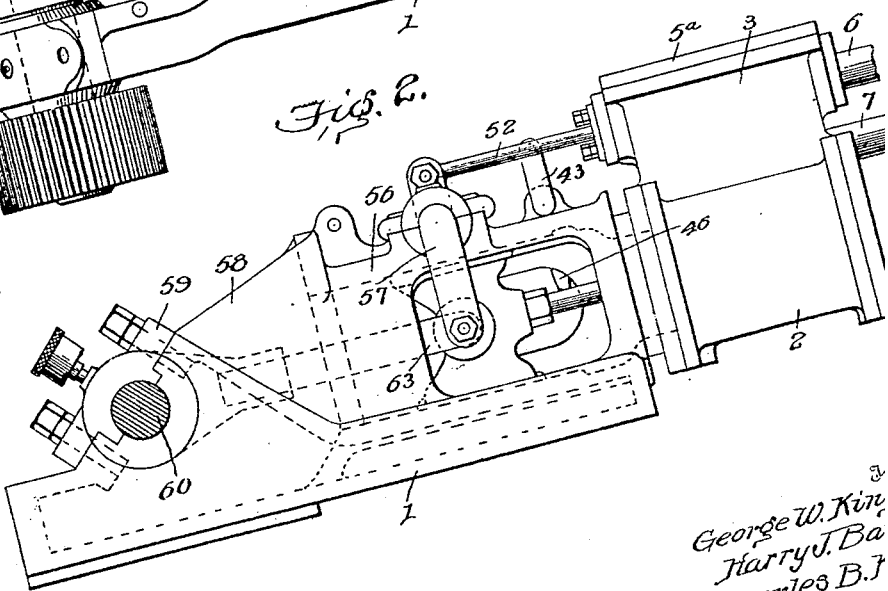
Figure 6:
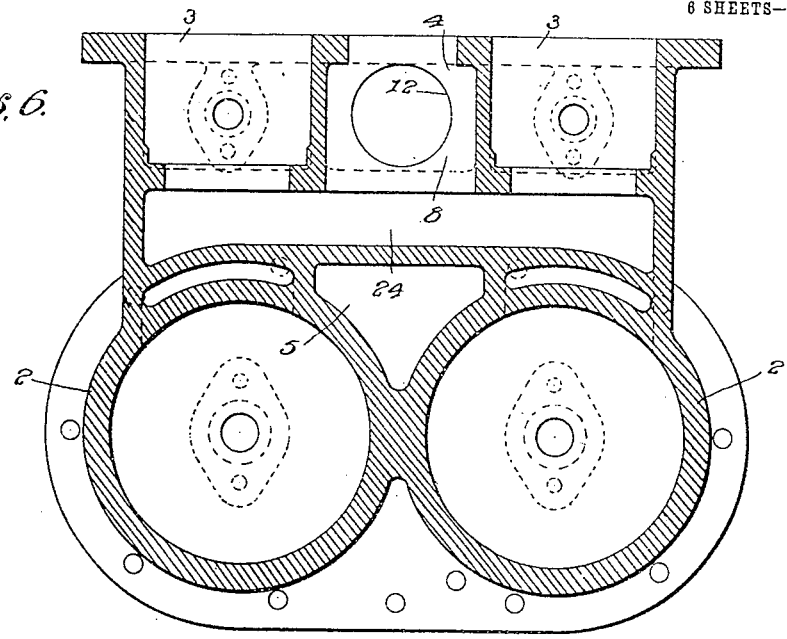
Figure 7:
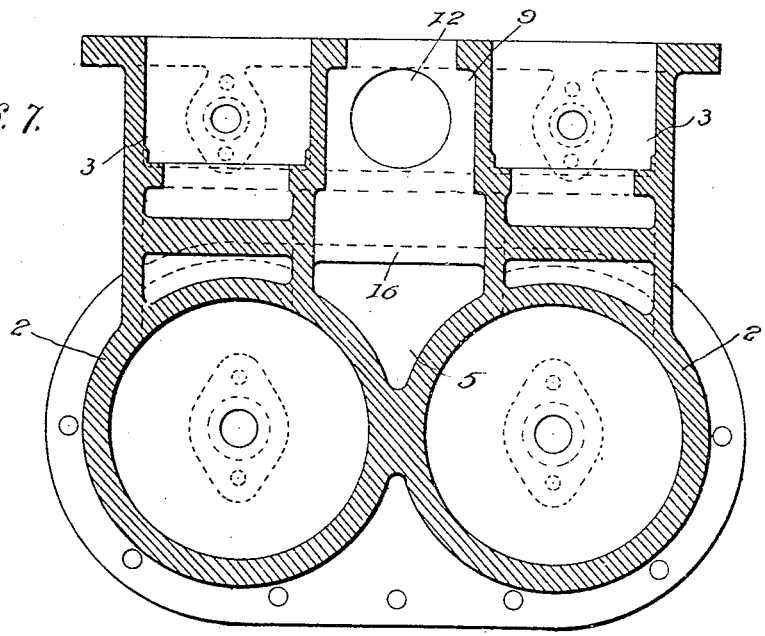
Figure 8:
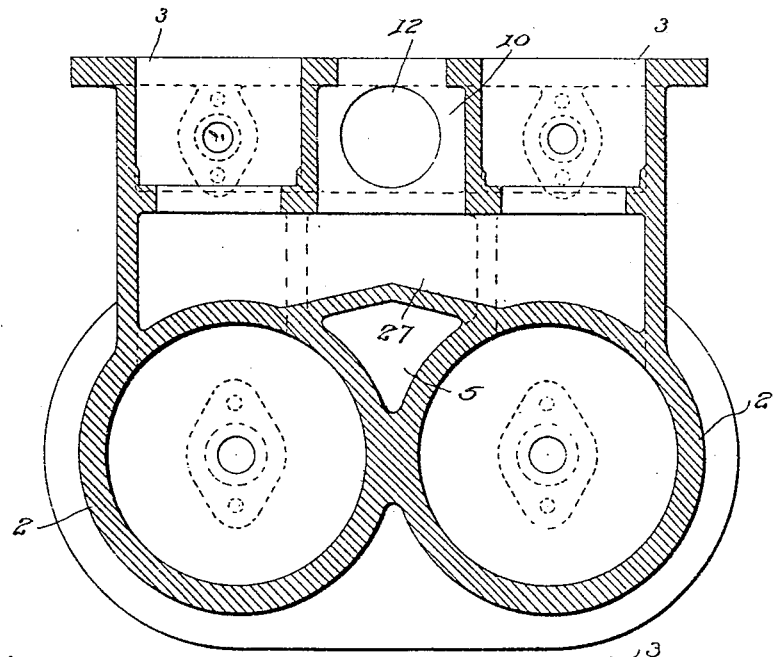
Figure 9:
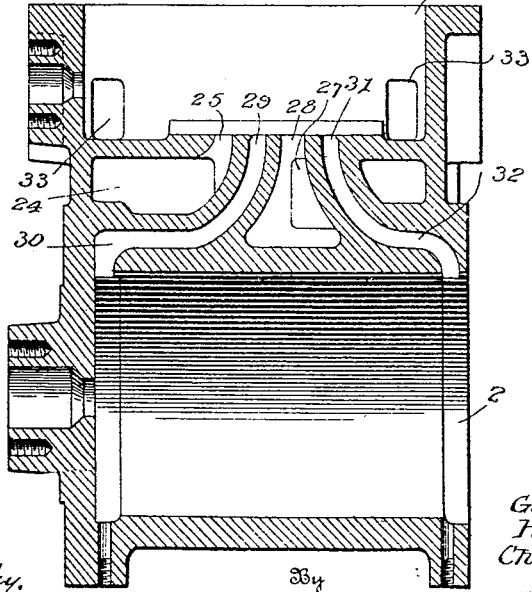
Figure 10:
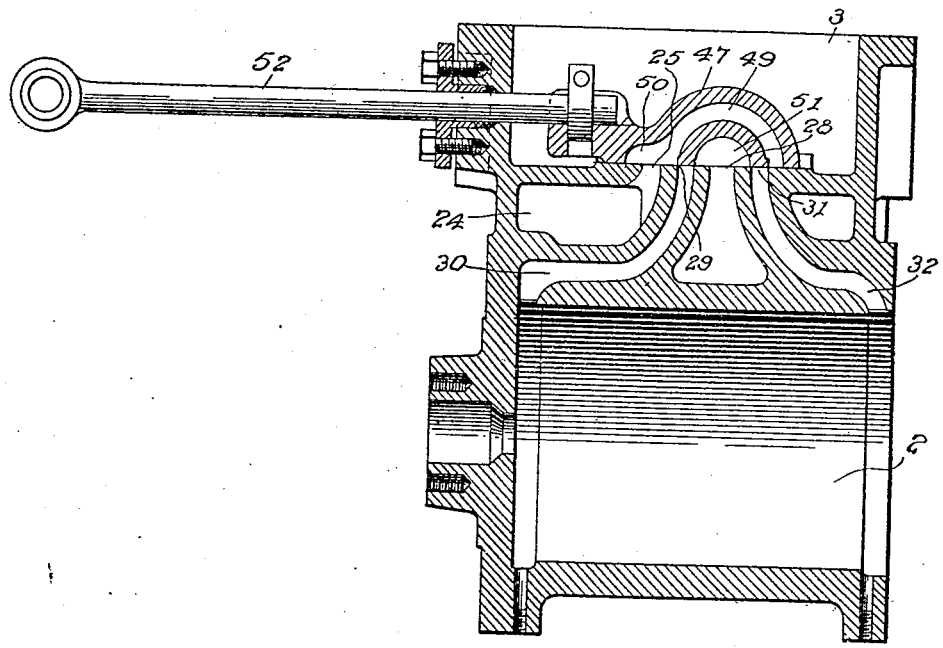
Figure 11:
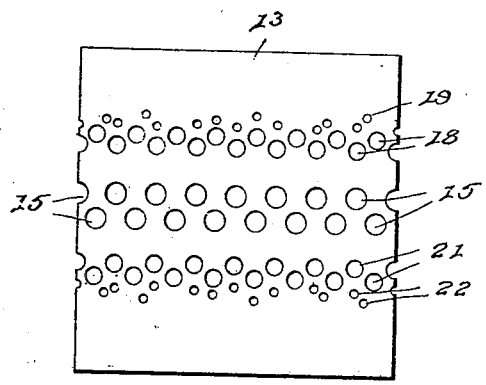

In the accompanying drawings, Figure 1 is a plan view of a double engine embodying our invention in one form. Fig. 2 is a side elevation of the same with the crank-shaft in section. Fig. 3 is an enlarged plan view of the cylinder end of the engine with the steam-chest cover removed. Fig. 4 is a front elevation or end view of the cylinders and steam-chest. Fig. 5 is a vertical sectional view taken on the line *u u* of Fig. 3 and looking in the direction of the arrows. Fig. 6 is a vertical sectional view taken on the line *v v* of Fig. 5 and looking in the direction of the arrows. Fig. 7 is a similar view taken on the line *w w* of Fig. 5 and looking in the direction of the arrows. Fig. 8 is a similar view taken on the line *x x* of Fig. 5 and looking in the direction of the arrows. Fig. 9 is a vertical sectional view taken on the line *y y* of Fig. 3 and looking in the direction of the arrows. Fig. 10 is a vertical sectional view taken on the line *z z* of Fig. 3 and looking in the direction of the arrows; and Fig. 11 is a detail plan view of the reversing-valve casing split and flattened out, so as to show diagrammatically the arrangement of the steam-openings therethrough. In Fig. 3 the slide-valves are omitted, while in Figs. 6 to 9, inclusive, all of the valves are omitted.

Before proceeding to a detailed statement of our invention it should be noted that the particular type of engine to which our invention is shown applied in the drawings is a double engine having two cylinders and two pistons operating upon a common crank-shaft; but our invention is not limited in its broader features to this particular type of engine, which is chosen chiefly for purposes of illustration.

Referring to said drawings, 1 indicates the bed-plate casting, to one end of which is secured a casting comprising the two cylinders 2 and steam-chests 3. Between the steam-chests is located the reversing-valve chamber 4, and below said valve-chamber between the cylinders is located the exhaust-chamber 5. The steam-chests and reversing-valve chamber are closed at the top by a removable cover 5ª. Steam is admitted to the front end of the valve-chamber by a steam-supply pipe 6, while the exhaust-steam passes away from the exhaust-chamber 5 through an exhaust-pipe 7. The valve-chamber is divided transversely by vertical partitions 8, 9, 10, and 11, each of which is provided with a circular opening 12 to receive the reversing-valve casing 13, which is in the form of a hollow cylinder open at both ends and fitting the openings 12, in which it is fixed. The space 14 in the valve-chamber 4 lying between the partitions 9 and 10 is in communication with the interior of the casing 13 by means of relatively large apertures 15, and said space 14 is provided at the bottom of the valve-chamber with a port or passage 16, communicating with the exhaust-chamber 5. The space 17 between the partitions 8 and 9 is in communication with the interior of the casing 13 by means of a plurality of apertures 18 and 19, formed through the body of said casing, the apertures 19 nearest the adjacent end of the casing being smaller than the apertures 18 nearest the middle of the casing. Similarly the space 20 in the valve-chamber between the partitions 10 and 11 is in communication with the interior of the casing 13 through a plurality of apertures 21 and 22, the apertures 22 being smaller than the apertures 21 and located nearer the adjacent end of the casing. The space 17 is provided at its bottom with a port 23, which communicates with a passage 24, leading to each steam-chest and communicating there with a port 25. The space 20 is provided with a port 26 in its bottom communicating with a passage 27, leading to both cylinders and communicating with a port 28. Each steam-chest has a port 29 located between the ports 25 and 28 and communicating by a passage 30 with the rear end of the cylinder and a port 31, located in front of the port 28 and communicating by a passage 32 with the front end of the cylinder. Each steam-chest is further provided in its inner wall with ports 33 at each end thereof opening into the end spaces 34 of the reversing-valve chamber.

35 indicates the reversing-valve, which is a piston-valve of tubular form having a passage 36 extending therethrough from end to end, so that steam is free to pass through said valve, and the end portions 34 of the reversing-valve chamber, as well as the upper portions of the two steam-chests, are always full of steam at full pressure when the engines are at work. The central portion of the valve 35 is provided externally with an annular groove or steam-channel 37 of a length about equal to or somewhat greater than the distance between the ports 23 and 26. The body of the valve at each end thereof beyond this annular steam-chest fits the interior of the valve-casing 13 and is provided with annular packing-rings 38, by means of which a steam-tight fit is maintained between said valve and its casing. The packing-rings move smoothly over the apertures in the valve-casing, which apertures permit the employment of said packing-rings. The reversing-valve is provided with a stem 39, which passes out through a stuffing-box 40 at the rear end of the valve-chamber and is provided at its extremity with a vertically-slotted head 41, the slot whereof is engaged by a pin 42, carried by an arm 40 on a rock-shaft 44, said rock-shaft being mounted in bearings 45 on the top of the engine-frame casting and being provided at one side thereof with an arm 46, to which the rod or other means by which the reversing-valve is operated may be attached.

Each steam-chest is provided with a hooded valve 47, which is held to its seat 48 by means of the pressure of the steam maintained in the valve-chest through the ports 33. This hooded slide-valve 47 is provided with a steam-passage 49, elongated at one end or port, as indicated at 50, and adapted to establish communication between the ports 25 and 29 when the valve is in one position and between the ports 25 and 31 when the valve is in the other position. The slide-valve 47 also is provided with a port or passage 51 in the form of a transverse groove in the under face of said valve adapted to establish communication between the port 28 and either one of the ports 29 or 31, according to the position of the valve. Each slide-valve 47 has a stem 52, which is connected to an arm 53 on a rock-shaft 54, mounted in bearings 55 on top of the engine-frame casting. Each rock-shaft 54 extends beyond the side of the vertical wall 56 of the body of the frame-casting, which is here relatively narrow or contracted, and is provided outside of said vertical wall with a downwardly-extending arm 57. Back of this point the vertical portion of the frame-casting is widened out, as indicated at 58, and receives the bearings 59 for the crank-shaft 60, having the double crank 61. The eccentrics 62 are located on said crank-shaft within the vertical portion of the frame between each end of the crank 61 and the adjacent bearing 59, and the eccentric-rods 63 extend through openings in the bed-plate casting, as indicated at 64, and have their extremities connected to the lower ends of the corresponding arms 57.

In the operation of the structure which we have described steam is admitted to the reversing-valve chamber 4 through the supply-pipe 6 and passing directly through the passage 36 in the reversing-valve 35 fills the spaces 34 at the ends of the reversing-valve chamber and exercises a practically equal pressure on both ends of the reversing-valve, so that the same is readily movable in either direction, and since said valve is a piston-valve it is not held against its seat by steam-pressure, which further contributes to the facility with which it may be moved. The steam also passes from the reversing-valve chamber 4 through the ports 33 into the steam-chests 3, where it serves to hold the hooded valves 47 down upon their seats. When the reversing-valve is in the position shown in Fig. 5, steam is cut off from the engines. If said valve be moved to the right of said Fig. 5, steam will pass from the space 34 at the rear end of the reversing-valve chamber, through the open end of the casing 13, and through the relatively small apertures 19 to the port 23.

It will be understood that when the engines are first started the valve 35 is moved to the right of Fig. 3 a distance only sufficient to uncover the smaller apertures 19, so that a relative small amount of steam is first admitted to the engines, thus preventing them from starting with a jerk. After the engines have been properly started the valve 35 is moved farther over to the right of Fig. 3, so as to uncover the larger apertures 18 also, so that sufficient steam is admitted for the full capacity of the engines. The steam passing through the port 23 enters the passage 24 and is thence delivered to the ports 25 of the valve-seats of the two steam-chests. The steam thus supplied from each port 25 is distributed by the corresponding valve 47 alternately to the adjacent ports 29 and 31, while the exhaust-steam is delivered alternately from said ports 29 and 31 to the central port 28. The exhaust-steam from each cylinder passes from the port 28 through the passage 27 to the port 26, and thence through the apertures 21 and 22 in the valve-casing to the annular groove or steam-channel 37, formed around the exterior of the central portion of the reversing-valve 35. This channel or groove is always in communication with the exhaust port or passage 16, through which the exhaust-steam passes to the exhaust-chamber 5, and thence out through the exhaust-pipe 7.

When it is desired to reverse the direction of movement of the engine, the valve 35 is moved to the left of the position shown in Fig. 3 sufficiently to first uncover the smaller apertures 22 above the port 26, thus admitting the steam more slowly at first, the valve being subsequently moved sufficiently forward to the left to uncover the apertures 21 also. The live steam thus admitted through the port 26 passes through the passage 27 to the central ports 28 in each valve-chest, whence it is distributed by the valve 47 through the medium of the port or passage 51 alternately to the ports 21 and 31. The port or passage 49 takes the exhaust alternately from the ports 29 and 31 and delivers it to the port 25, whence it passes through the passage 24 to the port 23 and through the apertures 18 and 19 to the annular exhaust-channel 37 of the valve 35, passing thence through the port or passage 16 to the exhaust-chamber 5 and out through the exhaust-pipe 7.

It will be seen that the engine may be readily caused to run in either direction by shifting the valve 35 to the proper position, and the admission of steam at the beginning of the reversing movement may be readily graduated through the provision of the different-sized apertures in the valve-casing. It will also be seen from an inspection of Fig. 11 that these apertures are not only of different sizes, but are also arranged in different transverse planes relatively to the direction of movement of the valve, so that not only apertures of different sizes are progressively uncovered as the opening movement of the valve proceeds, but an increased number of openings are also uncovered, thus further regulating the admission of steam.

While the valve-casing 13 is not indispensable, it is of material advantage, for the reason that it permits the employment of the packing-rings 38 to form a steam-tight fit between the reversing-valve and its inclosing means, at the same time permitting the valve to be so constructed as to move easily within the casing. The packing-rings will move smoothly over the apertures in the casing without catching in the same, while the employment of the usual slotted ports would prevent such operation, and consequently the employment of said packing-rings. We have therefore provided a practically balanced steam-tight piston-valve which may be moved by a very light application of power for the purpose, which is adapted to so admit the steam to the engines as to prevent their sudden and violent starting and by means of which the direction of movement of the engine may be readily reversed.

When our invention is applied to a double engine, as in the construction chosen for purposes of illustration, it will be seen that the arrangement of the reversing-valve and its chamber and of the exhaust-chamber is such that it in no way increases the amount of space occupied by the engines, giving superior compactness and direct and short steam-passages between the reversing-valve chamber and steam-chests and between the steam-chests and exhaust-chamber.

We do not wish to be understood as limiting our invention to the precise details of construction hereinbefore described, and shown in the accompanying drawings, as it is obvious that these details may be modified without departing from the principle of our invention. For instance, the valve-casing is preferably made separate from the main casting which forms the cylinders and steam-chests, since such a construction is more readily manufactured with less danger of defective castings; but our invention also contemplates the formation of the valve-casing in one piece with the remainder of said casting. Furthermore, although we prefer to employ for the graduated admission of steam the circular apertures of successively-increasing size shown in the accompanying drawings an obvious equivalent thereof would be the employment of elongated holes or slots smaller at one end and increasing in width toward the other.

Having thus fully described our invention, what we claim as new, and desire to secure by Letters Patent, is—

1. In a reversing-engine, two parallel cylinders having their adjacent sides in contact, steam-chests mounted on the upper sides of said cylinders arranged to form a reversing-valve chamber between their adjacent walls, and a common closure for said steam-chests and said chamber, substantially as described.

2. In a reversing-engine, a casting comprising two parallel cylinders having their walls directly united, and two parallel but separated steam-chests mounted on corresponding sides of said cylinders, and a reversing-valve chamber formed in said casting between side walls of the steam-chests and an exhaust-chamber between said steam-